(12) United States Patent
Sakama et al.

(10) Patent No.: US 8,098,133 B2
(45) Date of Patent: Jan. 17, 2012

(54) RADIO FREQUENCY IDENTIFICATION TAG

(75) Inventors: Isao Sakama, Hiratsuka (JP); Shimpei Hesaki, Sayama (JP); Nobuhiro Kudo, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 12/200,349

(22) Filed: Aug. 28, 2008

(65) Prior Publication Data
US 2009/0085751 A1    Apr. 2, 2009

(30) Foreign Application Priority Data

Sep. 28, 2007  (JP) .................................. 2007-253027

(51) Int. Cl.
*H04Q 5/22* (2006.01)
*G08B 13/14* (2006.01)

(52) U.S. Cl. ..................................... 340/10.1; 340/572.2

(58) Field of Classification Search ................. 340/10.1, 340/572.2
See application file for complete search history.

(56) References Cited

U.S. PATENT DOCUMENTS

| 6,359,842 | B1 | 3/2002 | Taguchi |
| 7,443,299 | B2* | 10/2008 | Forster .................... 340/572.7 |
| 2004/0046699 | A1* | 3/2004 | Amano et al. ............. 343/702 |
| 2005/0242960 | A1* | 11/2005 | Tikov et al. .............. 340/572.7 |
| 2006/0028344 | A1 | 2/2006 | Forster |
| 2008/0057258 | A1* | 3/2008 | Kanno et al. .............. 428/64.4 |

FOREIGN PATENT DOCUMENTS

| WO | WO 99/38162 | 7/1999 |
| WO | WO 2004/107261 | 12/2004 |

* cited by examiner

*Primary Examiner* — Benjamin C. Lee
*Assistant Examiner* — Cal Eustaquio
(74) *Attorney, Agent, or Firm* — Mattingly & Malur, PC

(57) ABSTRACT

An RFID tag having mounted thereon an IC chip capable of receiving and delivering information from and to an external source without contact. In the RFID tag, a central axis of its own antenna having mounted thereon the IC chip coincides with a center of the RFID tag, and an antenna width is controlled. That is, a position of the central axis of the antenna is controlled to correct the mass eccentricity of the RFID tag. Further, the RFID tag is an RFID tag having mounted thereon the IC chip capable of receiving and delivering information from and to an external source without contact, and an RFID tag having attached thereon the IC chip at a position in which a first and a second antenna lengths are different from each other.

2 Claims, 14 Drawing Sheets

NOTCH

RADIO FREQUENCY IDENTIFICATION TAG

INCORPORATION BY REFERENCE

The present application claims priority from Japanese application JP2007-253027 filed on Sep. 28, 2007, the content of which is hereby incorporated by reference into this application.

BACKGROUND OF THE INVENTION

The present invention relates to an RFID (Radio Frequency Identification) tag for wirelessly transmitting information such as ID (Identification) recorded in an IC chip.

An RFID tag comprises an IC chip and an antenna and can wirelessly transmit information such as an ID number recorded in the IC chip from the antenna. Accordingly, when communicating with the RFID tag using a reader/writer, information recorded in the IC chip can be read without contact. Thanks to radio transmission, information on IC chips can be read even in articles stored in a bag or box. Therefore, the RFID tag is widely used for manufacturing management and logistics of articles. In the management, the management of CD (Compact Disk), being an optical disk for use in music, or DVD (Digital Versatile Disk), being an optical disk for use in video, such as movies is included. In recent years, management enhancement of sensitive information and personal information is being promoted and the application of the RFID tag to disk media such as the CD and DVD having stored therein the information is being promoted. In reality, a data reading speed of these disk media increases and the rotation speed of the disk media exceeds 10000 rpm. It is needed to reduce the displacement of a center of gravity (hereinafter, referred to as a mass eccentricity) of the disk medium including the RFID tag.

U.S. Pat. No. 6,359,842 B1 discloses that when relative to the mass eccentricity due to the attaching of the IC chip to the disk, a balancer is provided at a position being point-symmetric to the IC chip with the center of the disk as the starting point, the amount of mass eccentricity is reduced.

SUMMARY OF THE INVENTION

An RFID tag can be mounted on a disk medium by the technology described in U.S. Pat. No. 6,359,842 B1. However, in U.S. Pat. No. 6,359,842 B1, a balancer must be prepared and extra operation such as provision of the balancer also occurs. In the technology disclosed in U.S. Pat. No. 6,359,842 B1, it is also difficult to attach the RFID tags on all of the currently distributed disk media. For example, in the DVD having recorded thereon data on both surfaces of the disk medium, it is difficult to attach the balancer on a data storage area as described in U.S. Pat. No. 6,359,842 B1. An example of the DVD is consistently one example, and the present invention described below can also be applied to the CD having recorded thereon data on one surface of the disk medium.

Further, for construction materials of the disk medium, a metal conductive layer such as Au or Al is used as a light reflection film. This metal conductive layer is normally formed on a substrate of the disk medium using an evaporation method or a sputtering technique. A formation range of the metal conductive layer is different for each application or manufacturer. In order that a design property on a label surface is improved in the DVD, being a disk medium for movie appreciation, the metal conductive layer is formed up to an edge of an opening in the center of the disk medium in some times. When these metal conductive layers come close to a tag antenna, electrical characteristics of the antenna deteriorate and a communication distance of the RFID tag is reduced. The above-described metal conductive layer has not received attention. Antenna characteristics change near the metal conductive layer and as a result, a desired communication distance cannot be obtained. Further, when the RFID tag is attached on the metal conductive layer, the antenna characteristics largely change and the RFID tag does not function as a practical RFID tag in many cases. This is a phenomenon in the same manner as in the case in which a general purpose RFID tag is attached to a metal product. Therefore, the tag antenna is separated from the metal surface. That is, when taking measures to insert a thick spacer between the tag antenna and a metal member, the RFID tag can function as a practical RFID tag. However, when the RFID tag with the thick spacer is attached on the disk medium, the disk medium cannot be mounted on the disk drive in many cases, and therefore, the measures cannot be taken.

The present invention has been devised in order to solve the above-described problems, and the amount of mass eccentricity due to the attachment of the RFID tag is reduced. Further, it is an object thereof to provide the RFID tag which does not depend on a structure of the disk medium and with which stable communication characteristics are obtained.

The RFID tag according to the present invention is devised in order to attain the above-described object. For that purpose, the RFID tag according to the present invention is an RFID tag having mounted thereon an IC chip capable of receiving and delivering information from and to an external source without contact. In the RFID tag, the central axis of the RFID tag is determined from the central axes of the IC chip, the antenna and the substrate, and the mass eccentricity is reduced by allowing the central axis of the RFID tag to coincide with the rotation axis of the disk medium.

Further, for the requirement of a position of the central axis due to the requirement in structure of the disk media, the adjustment of an antenna width also relates to the present invention. In addition, a position of the central axis may be required not only from structure of the disk media but also from design.

An RFID tag according to the present invention is capable of receiving and delivering information from and to an IC chip without contact even if mounted on a high-speed rotating body.

Other objects, features and advantages of the invention will become apparent from the following description of the embodiments of the invention taken in conjunction with the accompanying drawings.

BRIEF DESCRIPTION OF THE DRAWINGS

FIGS. 3A and 3B are diagrams showing an RFID tag according to the first embodiment of the present invention, in which FIG. 3A is a construction view, and FIG. 3B is a top plan view.

FIGS. 4A to 4C are diagrams showing the RFID tag according to the first embodiment of the present invention, in which FIG. 4A is a top plan view, and FIGS. 4B and 4C are cross section views.

FIGS. 16A to 16D are process drawings showing processes for mounting an IC chip on a feeder section of an antenna 41, in which FIG. 16A shows feeder sections of the antenna and the IC chip, FIG. 16B is an enlarged view of the feeder section when the IC chip is mounted on the antenna, FIG. 16C shows cross sections of the antenna and the feeder section, and FIG. 16D is a conceptual diagram in which the IC chip is mounted on a feeder section of a T shaped slit.

FIGS. 17A and 17B are diagrams showing the RFID tag according to the first embodiment of the present invention, in which FIG. 17A is a construction view, and FIG. 17B is a top plan view.

DESCRIPTION OF THE EMBODIMENTS

With reference to the drawings, a preferred embodiment according to the best mode for carrying out the invention (hereinafter referred to as the embodiment) will be described below.

First Embodiment

Figure 1:
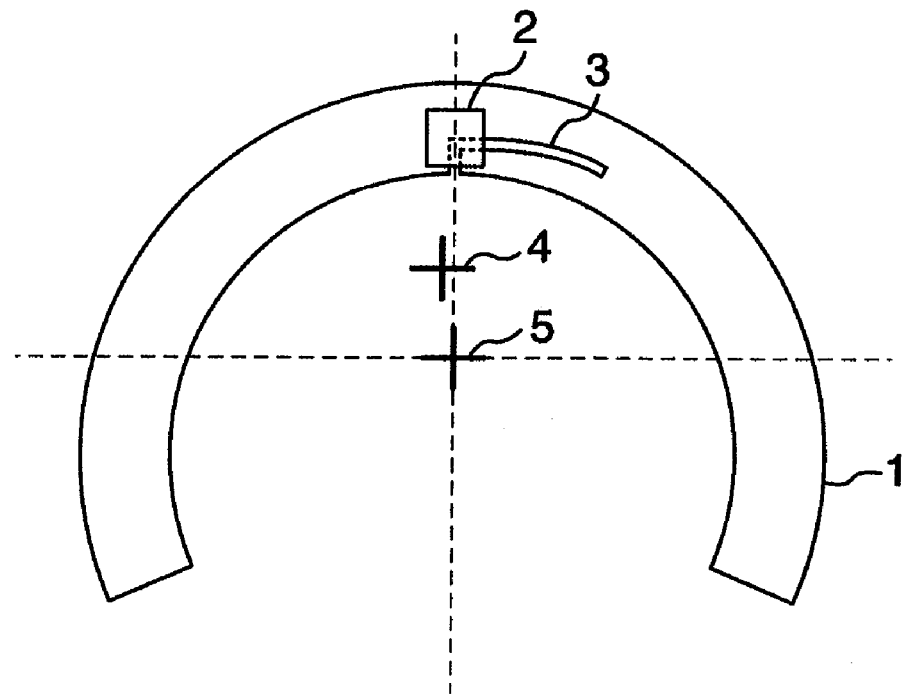
FIG. 1 is a top plan view of a circular tag antenna according to one embodiment of the present invention.

First, an RFID according to the first embodiment will be described with reference to FIG. 1. FIG. 1 shows an antenna of the circular RFID tag. On a circular antenna 1, an L-type slit 3 for performing impedance matching between an IC chip having recorded therein information and the antenna 1 is formed. The IC chip 2 having recorded therein information is mounted on this antenna 1. Description will be made later on the connection between the antenna 1 and the IC chip 2. There exists a center 5 being a center of a shape determined from a width and length of the antenna 1. A central axis of the antenna 1 having mounted thereon the IC chip 2 is located at a position shown in a central axis 4. When the antenna 1 is rotated around this central axis, a mass eccentricity can be canceled without using a balancer. The central axis used herein means an axis almost vertically penetrating an antenna surface via a center of gravity.

For measurement of the central axis, there is used a method of attaching the RFID tag on a rotating table and measuring by laser interferometry the amount of mass eccentricity at an end of the rotating table. As another method, the measurement using a vibration sensor is used.

Figure 2:
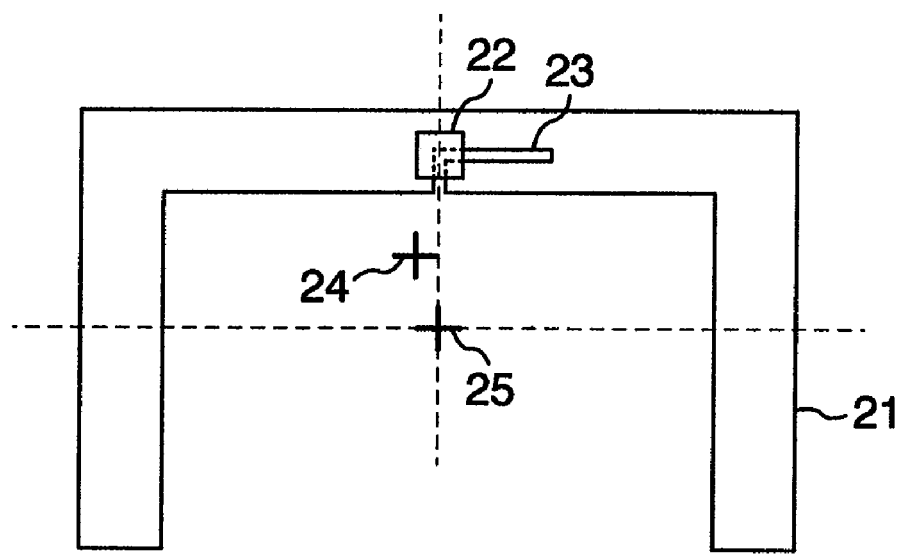
FIG. 2 is a top plan view of a rectangular tag antenna according to one embodiment of the present invention.

Further, in the same manner as in a rectangular antenna as shown in FIG. 2, when an IC chip 22 is mounted on an antenna 21 with an L-shaped slit 23, a center of the antenna is located in a center 25. A central axis of the antenna 21 having mounted thereon the IC chip 22 is located at a position shown in a central axis 24. When the antenna 21 is rotated around this central axis, mass eccentricity does not exist. Accordingly, in a tag with an arbitrary shape, when the antenna is rotated around the central axis, the mass eccentricity can be canceled without using a balancer near the antenna.

Figure 3A:
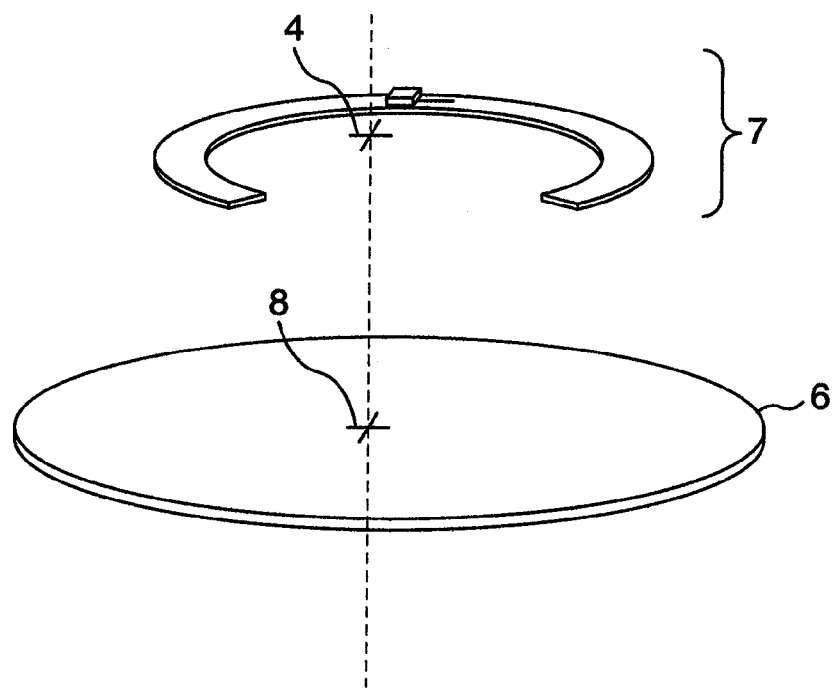
Figure 3B:
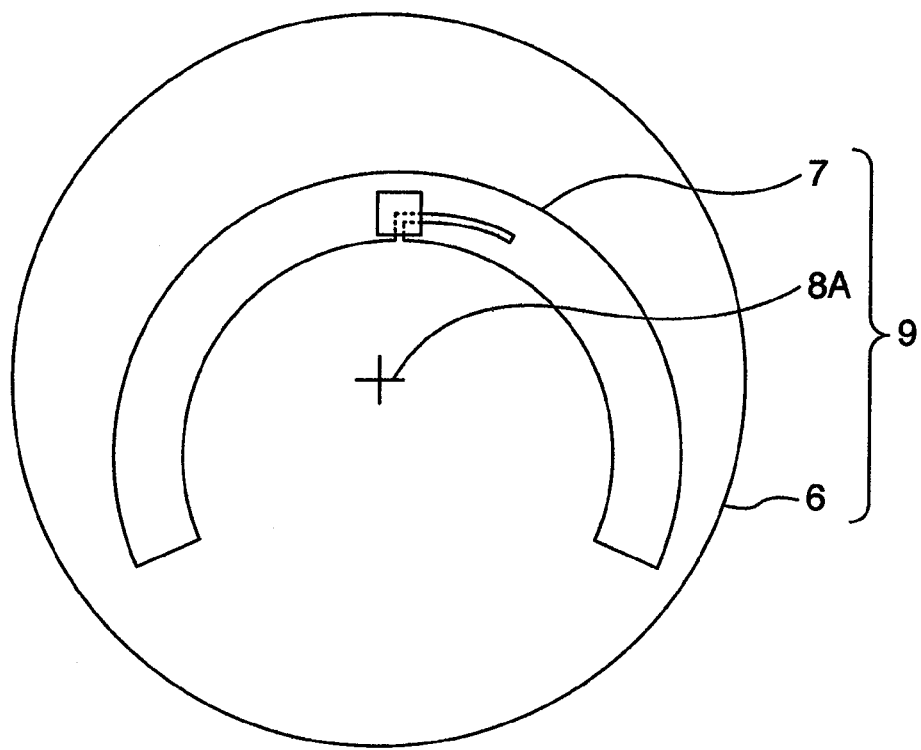
Figure 18:
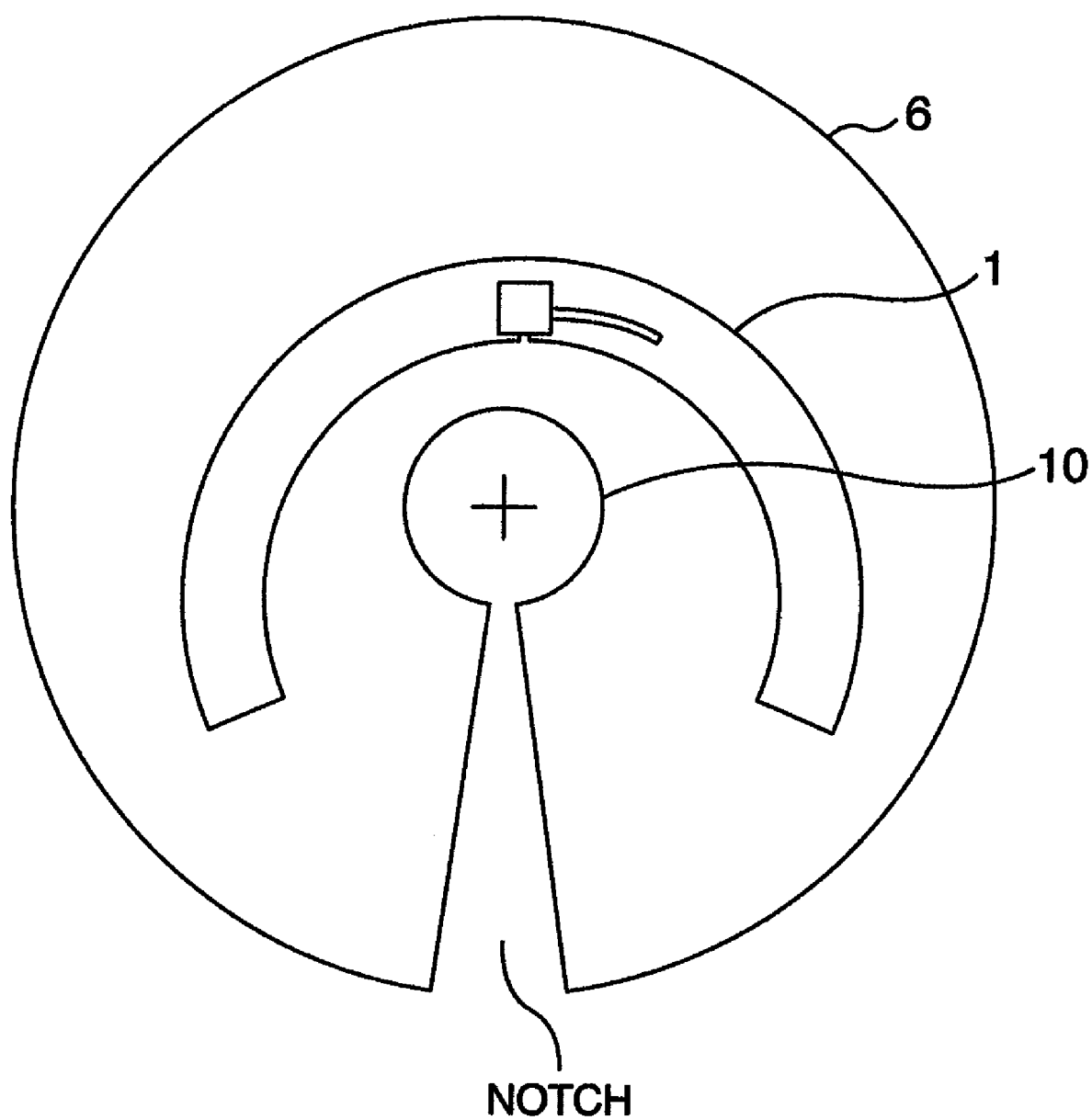
FIG. 18 is a diagram explaining a shape of a substrate.

Next, a method of forming the RFID tag according to the present embodiment will be described with reference to FIGS. 3A and 3B. FIG. 3A shows a construction view of the RFID tag and FIG. 3B shows a top plan view of the RFID tag. First, an appellation of the antenna such that the IC chip 2 is mounted on the antenna 1 described in FIG. 1 is defined as a tag antenna. That is, a reference numeral 7 shown in FIG. 3A depicts a tag antenna 7. A central axis of the tag antenna 7 is a central axis 4 and a central axis of the substrate 6 for retaining the tag antenna is a central axis 8. The substrate 6 shows a circular one; but is not limited thereto and may have an arbitrary shape. As shown in FIG. 18, a notched region may be formed so as to be contacted with an opening in the substrate. Further, an IC chip and an antenna may be directly formed on disk medium without using a substrate. When forming the RFID tag, the tag antenna 7 and the substrate 6 are arranged such that the central axes 4 and 8 of the tag antenna 7 and the substrate 6 coincide with each other and both are fixed with an adhesive or tacky adhesive. In a mass-production manner, as in a method of forming a general-purpose RFID tag, a film having laminated thereon a metal such as Al, namely, an antenna material on a large film sheet or film tape-like substrate is coated with resist and then, antenna patterns are transferred to the film by a printing, a photolithography method or the like. Further, an antenna pattern is formed by etching, and an IC chip is mounted. Next, when the RFID tag is processed by a punching operation around the central axis 4 of the tag antenna 7, the desired RFID tag 9 with a shape of FIG. 3B can be manufactured. For a product form of the RFID tag, a protective film such as PP (Polypropylene) and PET (Polyethylene-terephthalate) is attached on an antenna surface. Accordingly, a structure of the RFID tag has a shape in which the protective film, IC chip, antenna, substrate and adhesive are laminated in this order and each thickness is 20, 50, 10, 20 and 10 μm.

Figure 4A:
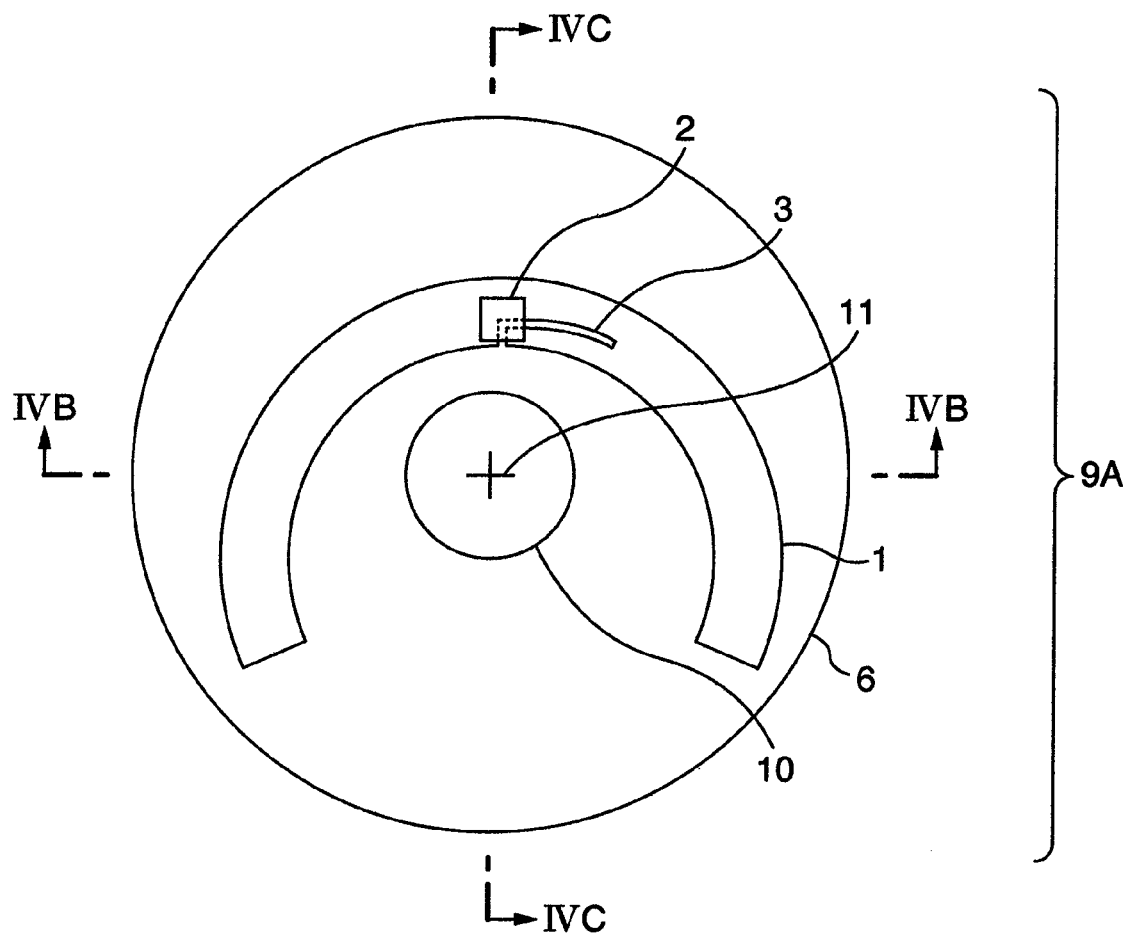
Figure 4B:
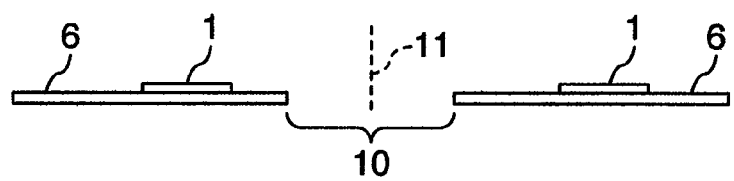
Figure 4C:
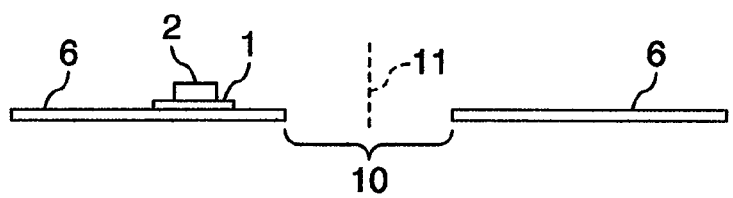

When a disk medium is set as an attaching object, the RFID tag 9 must be mounted in conformity to an opening at the center of the disk medium. FIGS. 4A, 4B and 4C show tag shapes taking an attaching to the disk medium into consideration. FIG. 4A shows a top view of the RFID tag. An opening 10 is formed around the point in which the central axis 8A of the RFID tag shown in FIG. 3B and the center 11 of the RFID tag coincide with each other. When the opening 10 has the same size as that in the opening of the disk medium or when the opening 10 is made larger than in size that of the disk medium, in mounting the disk medium on the disk drive, the opening 10 has an effect of preventing the RFID tag from being peeled off due to the contact with a spindle that is inserted into the opening. FIG. 4B shows a cross sectional shape of the RFID tag taken along line IVB-IVB and FIG. 4C shows a cross sectional shape of the RFID tag taken along line IVC-IVC. Here, the opening 10 may be a non-penetrated hole. Further, a position of the central axis may be marked to the extent to be recognized. In doing so, even in a rotating body incapable of attaching the RFID tag on the central axis, such as a gear, the RFID tag can also be attached on an end of the rotating axis of the rotating body.

Figure 5A:
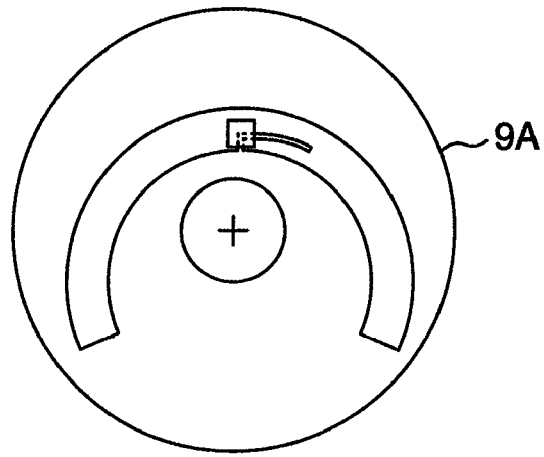
FIGS. 5A to 5C are diagrams explaining the attaching of the RFID tag to a disk medium according to the first embodiment of the present invention.
Figure 5B:
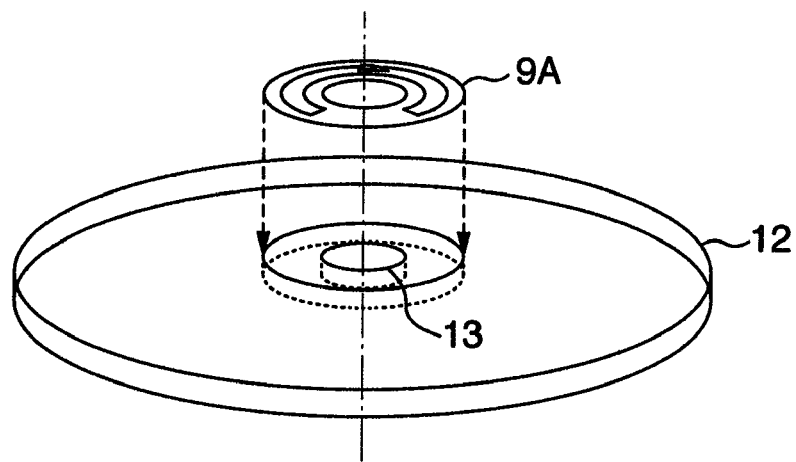
Figure 5C:
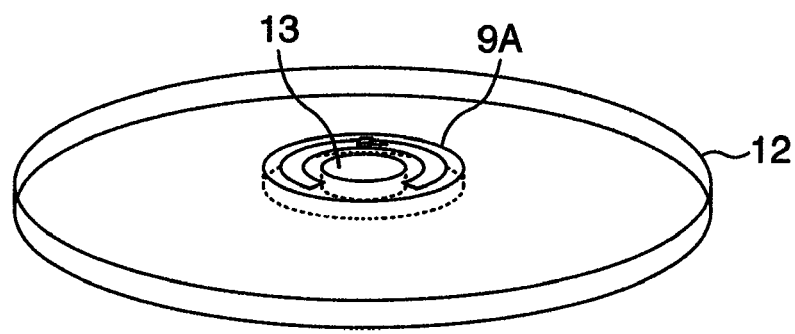

A method of mounting the RFID tag on the disk medium will be described with reference to FIGS. 5A to 5C. The RFID tag 9A shown in FIG. 5A depicts a tag in which the central axes of the tag antenna, the substrate and the center of an opening of the RFID tag coincide with each other. As shown in FIG. 5B, the RFID tag 9A is attached on the disk medium such that the center of an opening of the RFID tag 9A and that of the disk medium 12 coincide with each other. When the RFID tag 9A and the disk medium 12 are fixed using a tacky adhesive or adhesive, a desired disk medium having mounted thereon the RFID tag 9A can be formed as shown in FIG. 5C. As a tacky adhesive for use in the attachment, acrylic adhesive is frequently used. Since heat generation from the drive mechanism is large at the high speed rotation drive, when a tacky adhesive having high heat resistance is used, durability of the RFID tag can be more improved.

Figure 17A:
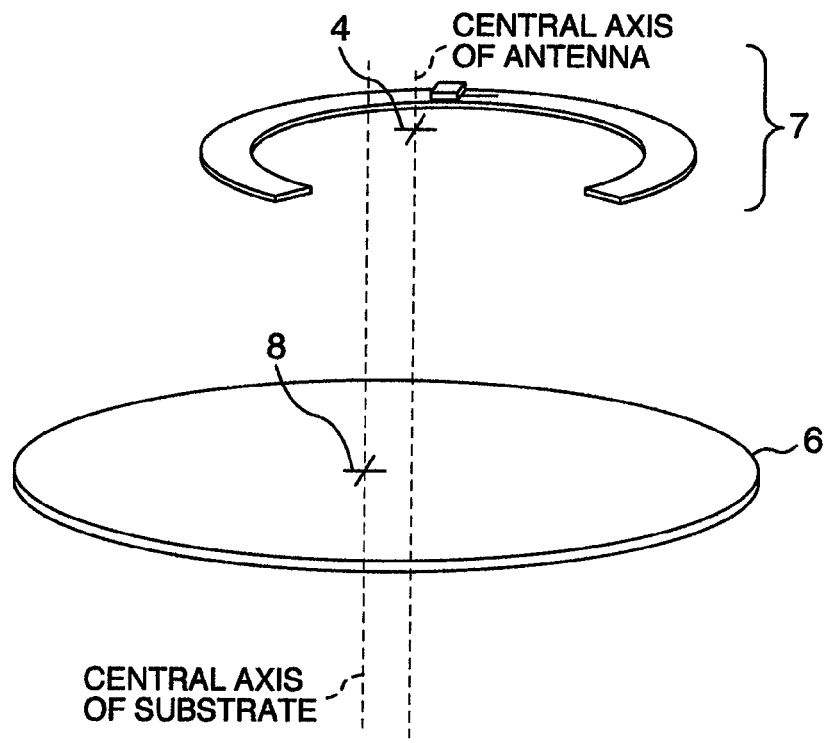
Figure 17B:
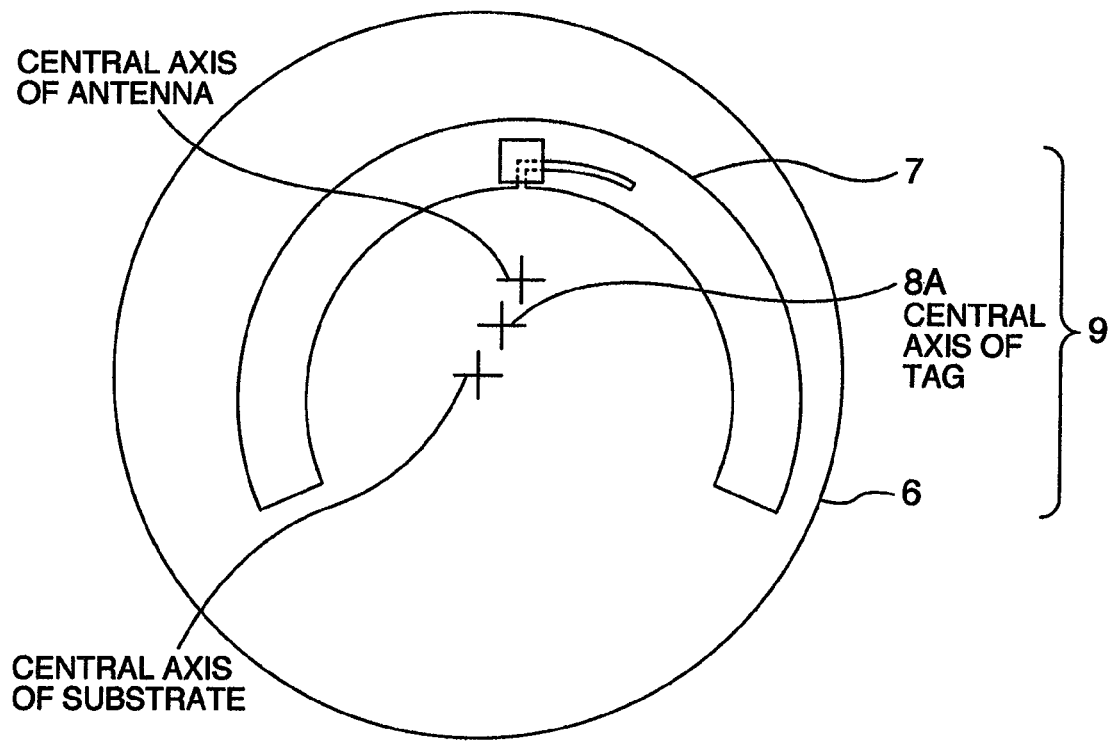

In a method of taking the central axis according to the present embodiment, each of the central axes of the IC chip, the antenna and the substrate may be deviated as shown in FIG. 17B. On this occasion, a combined central axis resulting from dynamically combining each of the central axes of the IC chip, the antenna and the substrate may substantially coincide with the center of the opening of the substrate or the rotation axis of the disk medium.

<Fundamental Structure of Disk Medium>

Figure 6:
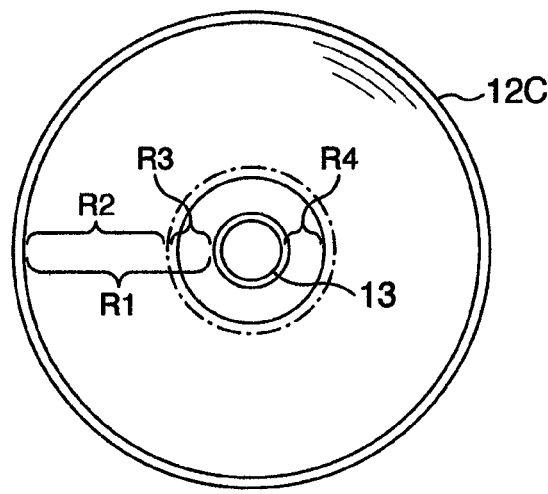
FIG. 6 is a schematic construction view of the disk medium.

The disk medium 12C shown in FIG. 6 has a fundamental structure common to general optical disk media such as the CD and DVD. More specifically, a central opening 13 is provided in the disk medium 12C and when the disk medium 12C is set in a player or disk drive, the disk medium 12C is rotated around the central opening 13 to irradiate an information recording surface of the disk with laser light, whereby signals are read out according to the quantity of light reflected from the surface. Further, in the outside area R1 as much as the prescribed distance from the central opening 13, a light reflecting film made of Au and Al is formed on a resin substrate, such as polycarbonate, being a substrate of the disk medium. This light reflecting film forms a thin film metal conductive layer having a thickness of several dozen nm. Further, an area R2 that is a part of the area R1 having formed therein the metal conductive layer forms an information recording area. An area R4 serves as a clamping area and is an area in which a disk drive retains the disk medium. Conventionally, the metal conductive layer is not formed on the clamping area R4 in many cases. In recent years, the metal conductive layer is increasingly formed also on the clamping area R4 in order to improve a design property on a label surface as a disk medium surface, in short, in order to have uniform gloss on a disk surface. An area R3 of the metal conductive layer within the clamping area R4 is different for each application or manufacturer.

Figure 7A:
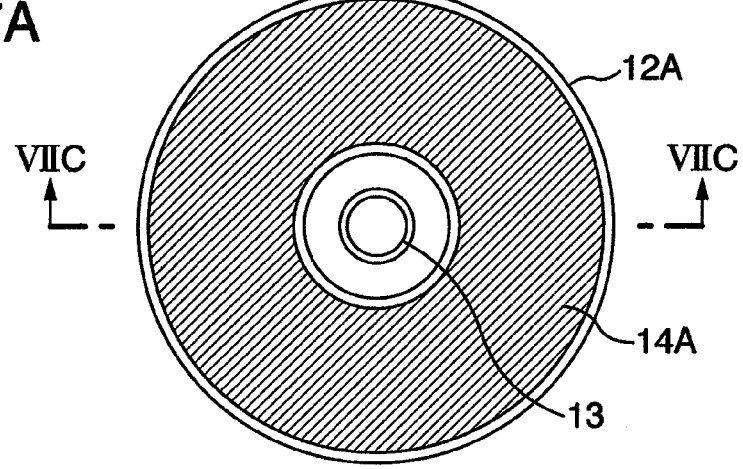
FIGS. 7A to 7C are diagrams explaining a structure of the disk medium.
Figure 7B:
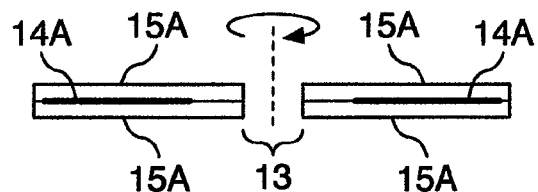
Figure 7C:
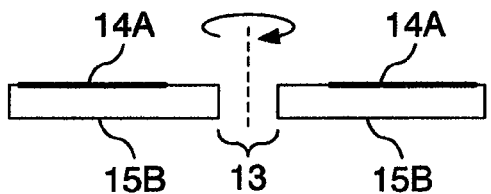
Figure 8A:
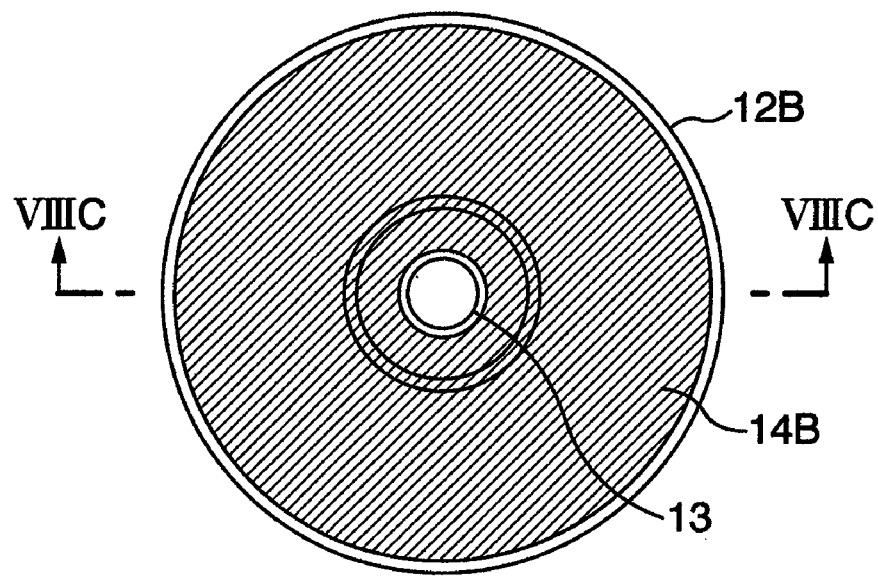
FIGS. 8A to 8C are diagrams explaining another structure of the disk medium.

Further, a forming position of the metal conductive layer on the resin substrate of the disk medium can be roughly classified. FIG. 7A shows a top plan view of a disk medium 12A in which a metal conductive layer 14A is not formed in the clamping area. FIGS. 7B and 7C show cross sectional structures taken along line VIIC-VIIC. FIG. 7B shows a case where the metal conductive layer 14A is formed between resin substrates 15A. FIG. 7C shows a case where the metal conductive layer 14A is formed on a resin substrate 15B. FIG. 7B shows a structure of the disk medium such as the DVD and FIG. 7C shows a structure of the disk medium such as the CD. A structure of FIG. 8 is the same as that of FIG. 7, and FIG. 8 shows a structure of the disk medium in which the metal conductive layer 14B is formed up to the clamping area.

When the disk medium is the CD, specifically, the resin substrate 15B has a thickness of about 1.2 mm. When the disk medium is the DVD, the resin substrate 15A has a thickness of about 0.6 mm and the disk has a thickness of about 0.6×2=1.2 mm.

The CD and DVD used at the moment each have a diameter of 120 mm. The area R1 having formed thereon the metal conductive layer has a diameter of 17 to 119 mm and the information recording area R2 in the area R1 has a diameter of 44 to 117 mm. The clamping area R4 has a diameter of 36 mm and the central opening 13 has a diameter of 15 mm.

Second Embodiment

Figure 8B:
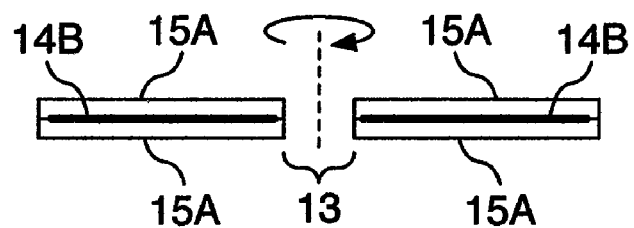
Figure 8C:
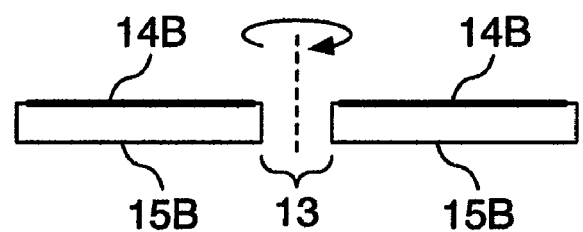

The embodiment will be described on the case where the metal conductive layer 14B serving as a light reflecting film is formed up to the clamping area of the disk medium as described above. FIG. 8B shows a method of attaching the RFID tag on the disk medium 12B having a DVD structure and in which the metal conductive layer 14B is formed up to the clamping area. In the structure of FIG. 8B, the metal conductive layer 14B is formed in the clamping area R4 having attached thereon the RFID tag. Accordingly, even if the RFID tag 9A described in the first embodiment is attached on the clamping area R4, the RFID tag cannot sufficiently respond to signals outputted from a reader due to the effect of the metal conductive layer 14B. This phenomenon is the same as that in the case where a general-purpose RFID tag is attached on a metallic article. Therefore, the RFID tag can be operated by a method of inserting a spacer between the metal conductive layer and the RFID tag 9A. However, the RFID tag 9A becomes thicker and therefore, cannot be attached on the disk medium.

Figure 9:
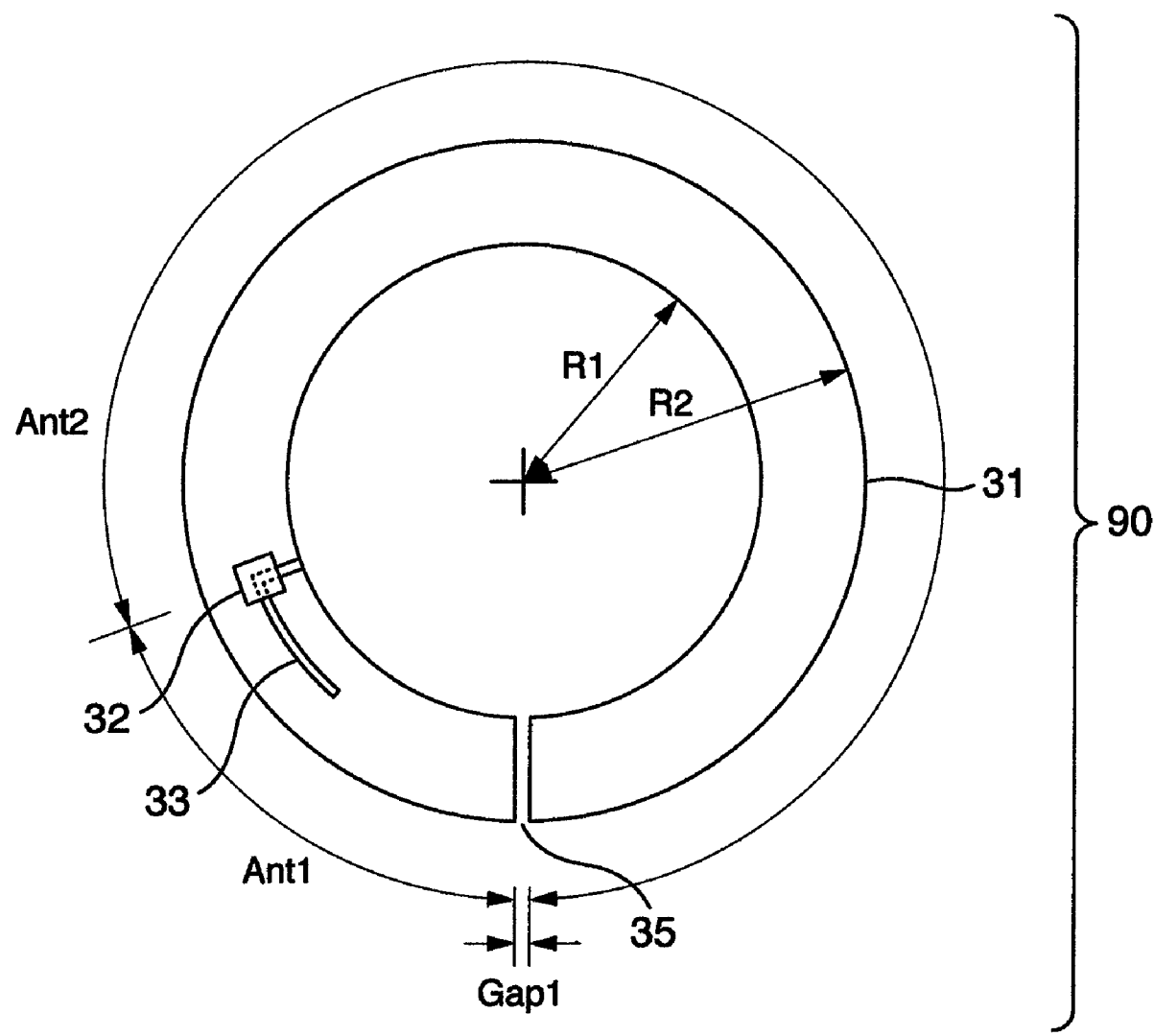
FIG. 9 is a top plan view of the tag antenna according to the second embodiment of the present invention.

In the following embodiment, when the IC chip 2 is mounted at a position at which lengths are different from each other in the lateral direction in an antenna having mounted thereon the IC chip 2, there is realized a tag antenna such that a relatively long communication distance is obtained even if the RFID tag is placed on the metal conductive layer of the disk medium. With reference to FIG. 9, description will be made on the RFID tag in which an IC chip 32 is mounted on an open ring-shaped tag antenna 31 and which operates on the metal conductive layer. An impedance matching circuit 33 is formed in the open ring-shaped antenna with an inner radius R1, an outer radius R2, an antenna width (R2−R1) and a distance between antenna ends, namely, a gap 35=Gap 1. With reference to a position at which the IC chip 32 is mounted, an antenna portion including the slit 33 is referred to as the first antenna and set to a portion with an antenna length of Ant 1 shown in the drawing. An antenna portion not including the slit 33 is referred to as the second antenna and set to a portion with an antenna length of Ant 2 shown in the drawing. In a normal dipole antenna, each of the antennas is set such that the first antenna is equal in length to the second antenna. However, when the antenna of this type is located near the metal conductive layer, the function of the antenna is deteriorated. In the antenna 31 of FIG. 9, each of the antennas is set such that the first antenna is shorter in length than the second antenna, and a length of the second antenna is set to an electrical length of $\lambda/2$ ($\lambda$: wavelength) or to be approximated to an electrical length of $\lambda/2$ at the operating frequency. Further, a length of the first antenna is set equal to or less than an electrical length of $\lambda/4$ at the operating frequency. Here, an electrical wavelength means a length in consideration of the effect of reduction in an antenna length due to the dielectric constant of a member on which the tag is attached. When the first antenna and the second antenna are not equal to each other, the second antenna is resonated through the first antenna. In this type, even if a distance between the tag antenna and the metal conductive layer varies, a change in the impedance of the tag antenna viewed from an input terminal of the IC chip, in other words, a change in the tuning frequency is extremely reduced. The fact corresponds to the presence or absence of the metal conductive layer under the tag antenna and has an advantage in that without regard to the structure of the disk medium, the RFID tag is attached on the disk media having different forming areas of the metal conductive layer described in FIGS. 7A to 7C and 8A to 8C.

Specific sizes of the antenna of FIG. 9 are as follows: R1=22 mm, R2=26 mm, an antenna width=2 mm, an outer peripheral length of Ant1=15 mm, an outer peripheral length of Ant2=65.6 mm, and Gap1=1 mm in a distance between antenna ends, namely, gap 35. An antenna material used is Al with a thickness of 20 μm and a substrate material used is PEN (Poly Ethylene Naphthalate) with a thickness of 20 μm. These materials are not limited to the above description; further, if being antenna materials, materials for use in the RFID tag, such as Cu and Ag paste can be used. In the same manner, PET and paper can be used as the substrate material. The substrate has the effect as a spacer between the antenna and the metal conductive layer, and the effect of improving a communication distance in the structure of FIG. 8C typified by the CD.

Further, a central axis of the tag antenna is found and an opening is formed around the position in which the central axis of the tag antenna and the central axis of the substrate coincide with each other. The same process is performed also in the present embodiment. Since contents of this process are described in the first embodiment, a detailed description is omitted. An RFID tag 9C (not shown) coated with acrylic adhesive with a thickness of 10 μm is applied to the back side of the substrate of the RFID tag 9B (not shown) herein formed is prepared and attached onto a recording type DVD-R disk having formed thereon the metal conductive layer up to the clamping area R4. As the communication distance of this RFID tag, the communication distance of 100 mm from an attaching surface of the RFID tag and that of 40 mm from a back side of the disk medium are obtained on the condition that an operating frequency is 2.45 GHz, a high-frequency output is 200 mW, and a reader antenna 6 dBi a patch antenna (circular polarization) is used.

Next, a method of reducing the amount of mass eccentricity through antenna shapes will be described. In the first and the second embodiments, the RFID tag in which the mass eccentricity is canceled is realized by adjusting positions of the IC chip and tag antenna on the substrate, namely, by adjusting positions of these central axes. However, depending on types of the IC chip and antenna, the mass eccentricity cannot be canceled, in some cases, in a correction processing only for adjusting a position of the central axis.

For example, suppose that when positions of the central axes coincide with each other in the heavy IC chip, the antenna partially mounts over the storage area of the disk medium. To cope with the above problem, description will be made on the method of reducing the amount of mass eccentricity through the antenna shapes using the following variations of five types.

(First Variation)

Figure 10A:
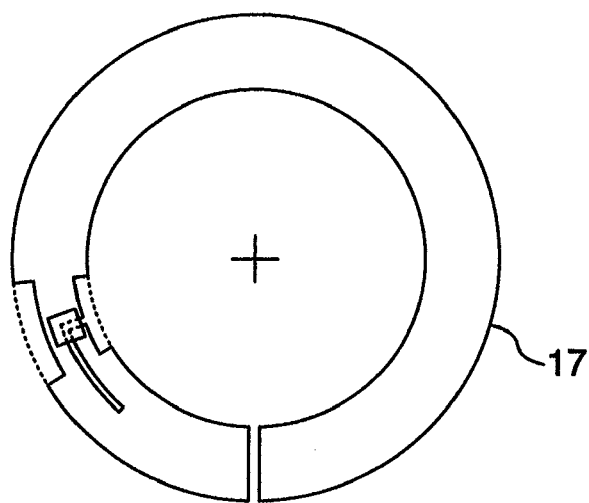
FIGS. 10A to 10C are top plan views of the tag antenna according to the second embodiment of the present invention.
Figure 10B:
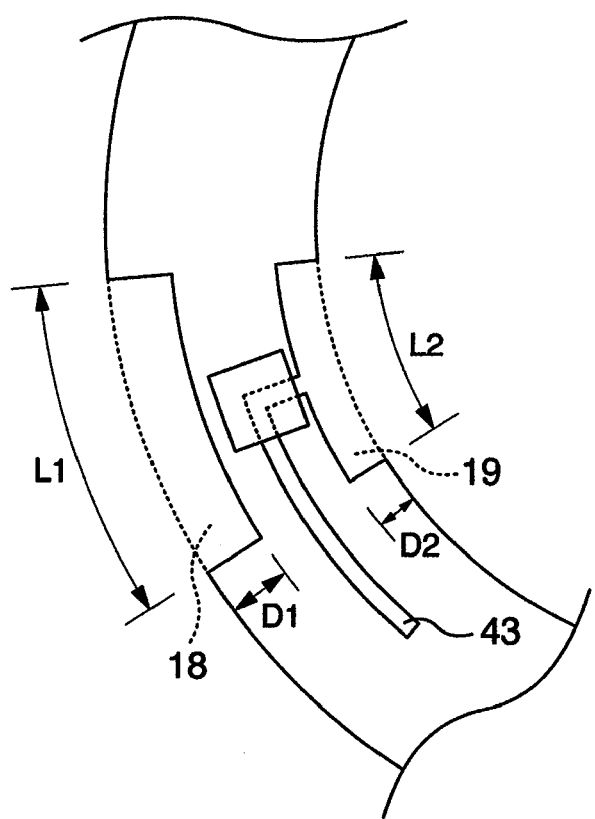
Figure 10C:
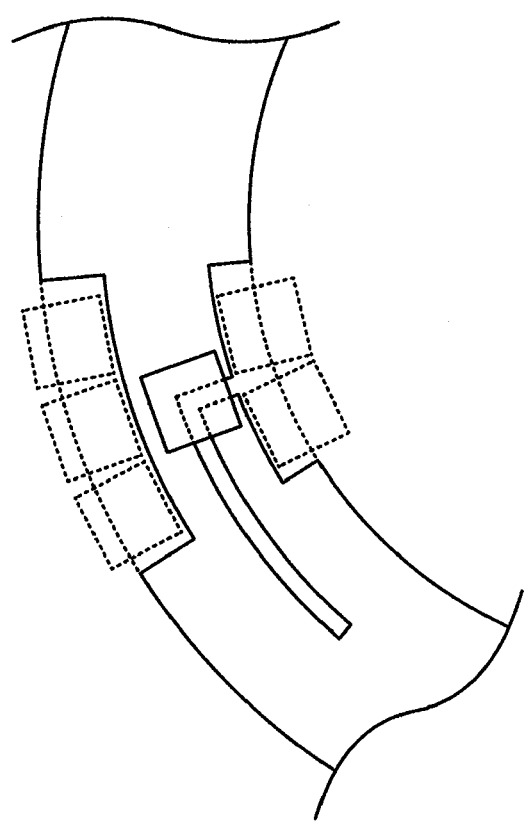

In a tag antenna 90, the mass eccentricity is caused by the IC chip 32 attached on the antenna 31, the slit 33 and the gap 35 between the antenna ends. First, when the IC chip 32 is taken notice of, the mass eccentricity is caused by weight of the IC chip. Accordingly, when the weight of antenna materials around the IC chip 32 is reduced as much as that of the IC chip 32, the mass eccentricity due to the IC chip can be canceled. In the same manner, the slit 33 can be considered integrally with the IC chip. That is, since the slit 33 is formed by removing an antenna material, formation of the slit 33 acts in the direction of canceling the weight of the IC chip 32. A method of correcting the mass eccentricity through the antenna shapes will be described with reference to FIGS. 10A to 10C. FIG. 10A shows a top plan view of a tag antenna 17. FIG. 10B shows a detailed portion to be removed of the antenna material. FIG. 10C schematically shows the amount of the antenna material to be removed. Assuming that a size of the IC chip 32 is 500 μm square, a thickness of the IC chip is 50 μm, and a thickness of Al of the antenna is 10 μm, the amount of the antenna to be removed is here calculated. A main constituent material of the IC chip is Si and a density thereof is 2.33 g/cm$^3$. Further, a density of Al of the antenna material is 2.7 g/cm$^3$. Another antenna material includes Cu and a density thereof is 8.92 g/cm$^3$. The volume of the IC chip 32 is 0.5×0.5×0.05=0.0125 (mm$^3$), and the weight thereof is 29.1 μg. When converting the weight to an area of Al with a thickness of 10 μm, the area is 1.08 (mm$^2$). When converting the area to an area of the IC chip, the area approximately corresponds to an area of four chips and corresponds to the removal of a part of the antenna, being 0.5 mm wide and about 2 mm long. Explaining this matter using FIG. 10B, antenna materials of an outer peripheral part 18 and an inner peripheral part 19 are removed from the open ring-shaped antenna having mounted thereon the IC chip. Here, when the weight of Al materials corresponding to the range of L1 long and D1 wide and the range of L2 long and D2 wide is the same as that of the IC chip, the mass eccentricity due to the IC chip can be substantially canceled. In the same manner, when the antenna is made of Cu, the antenna area is calculated. When the antenna made of Cu has a thickness of 10 μm, the antenna area is equal to 0.0033 (mm$^2$). As compared with Al, a material with a large density can correct the mass eccentricity by a small removal area. After the correction of the mass eccentricity, the circular tag antenna can be changed into a tag antenna having an open ring-shape with higher symmetry by using a method in which the central axis of the tag antenna coincides with the center of the RFID tag, as described in the first embodiment.

(Second Variation)

Figure 11:
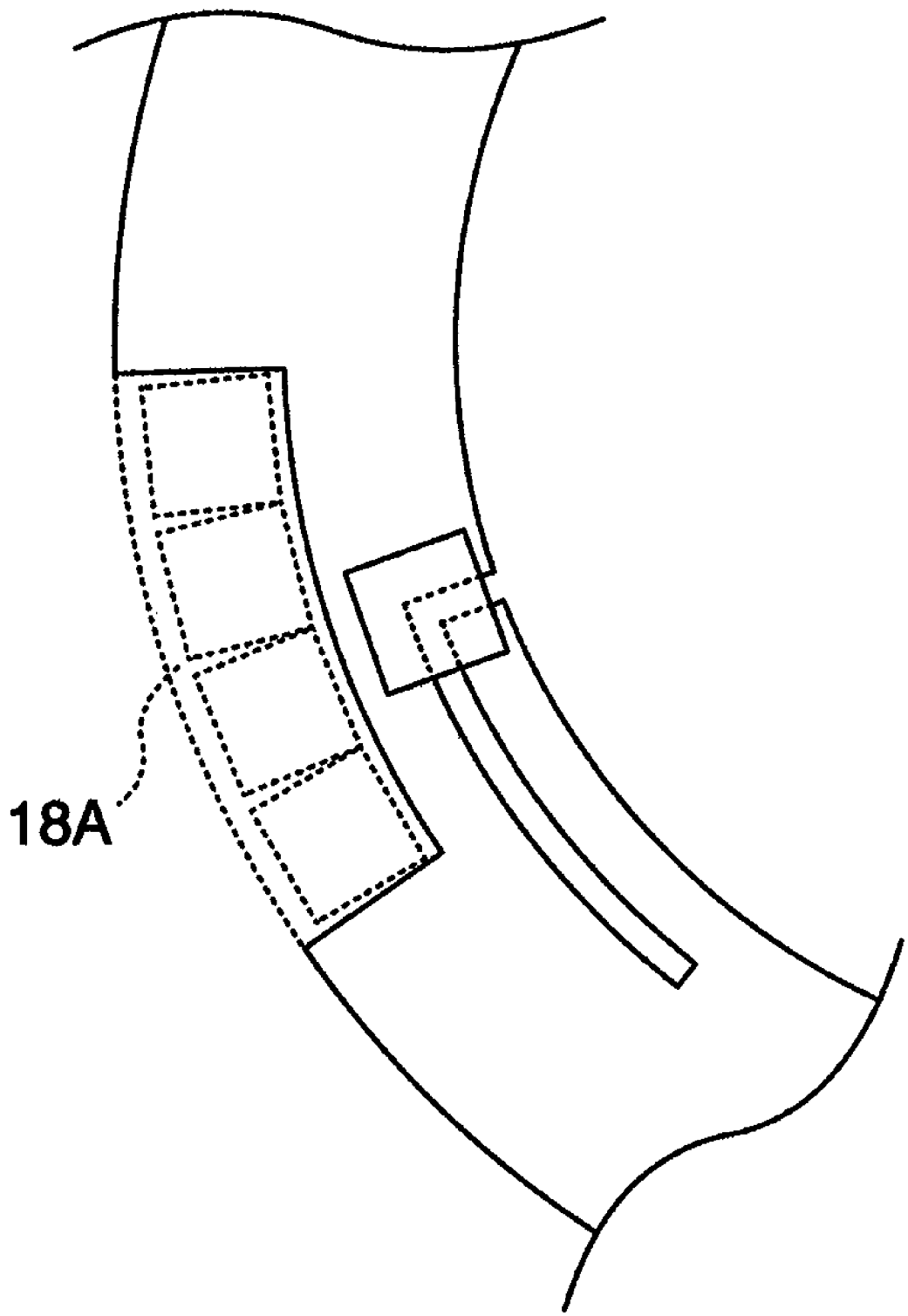
FIG. 11 is a top plan view of the tag antenna according to the second embodiment of the present invention (the second variation).

FIG. 11 shows a variation in which a removal area 18A of the antenna is set to an outer peripheral portion of the antenna. When the removal area is set only to the outer peripheral portion, a distance from the center of rotation becomes long. That is, when increasing, torque has an effect capable of reducing the removal area of the antenna. After the correction of the mass eccentricity, the mass eccentricity can be further corrected with higher accuracy by using a method in which the central axis of the tag antenna coincides with the center of the RFID tag, as described in the first embodiment.

(Third Variation)

Figure 12A:
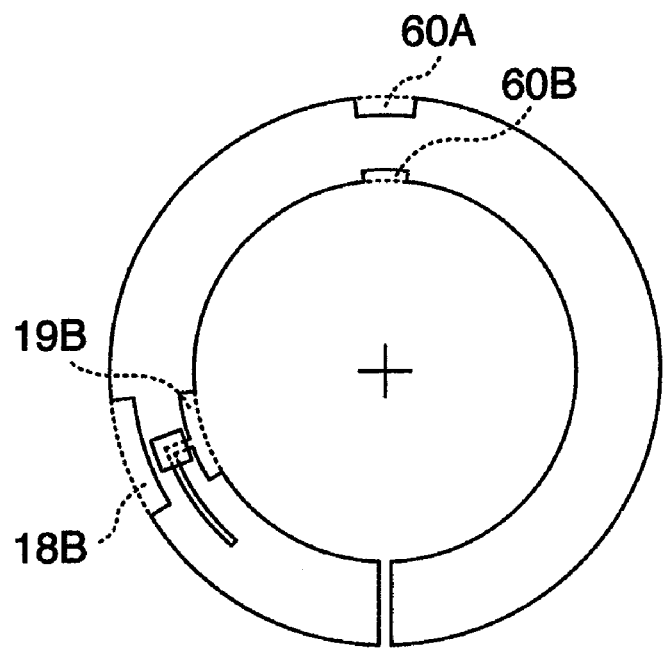
FIGS. 12A and 12B are top plan views of the tag antenna according to the second embodiment of the present invention (the third variation).
Figure 12B:
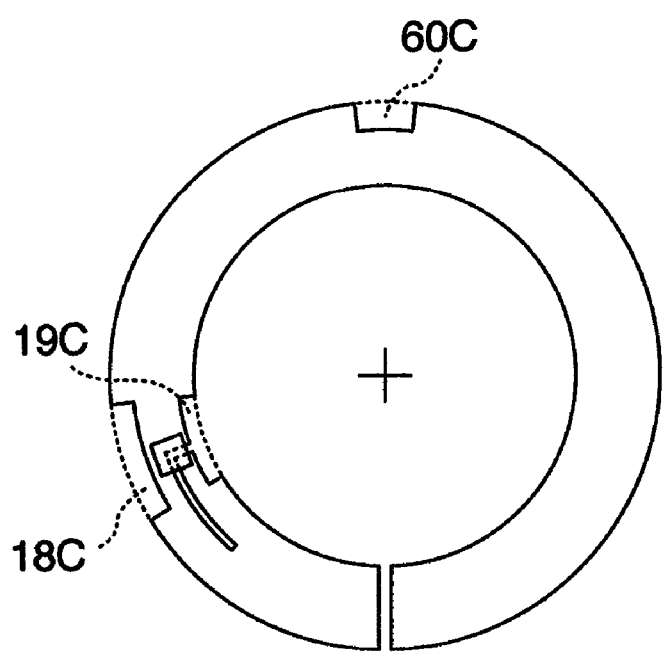

With reference to FIGS. 12A and 12B, description will be made on an example in which the mass eccentricity of the tag antenna 90 shown in FIG. 9 is corrected with higher accuracy. In the first and the second variations, the mass eccentricity due to the IC chip and the slit portion is taken notice of and corrected. Further, FIGS. 12A and 12B show an example in which the gap 35 between the antenna ends shown in FIG. 9 is also taken notice of and corrected. The gap 35 is a portion in which the antenna material is absent. Accordingly, when removing the antenna material at a position being point-symmetric with respect to the rotation center, namely, at removal areas 60A and 60B, the mass eccentricity can be corrected. FIG. 12A shows an example in which the removal areas 60A and 60B are set in the inner peripheral side and the outer peripheral side of the antenna. FIG. 12B shows an example in which the removal area 60C is set in the outer peripheral side of the antenna. In the case of FIG. 12B, since a distance from the rotation center increases, namely, the torque increases, the removal area of the antenna can be reduced. When an antenna width is narrow, a small removal amount is advantageous to the retainment of the antenna strength. After the correction of the mass eccentricity using the removal of the antenna member in the same manner as in the previous variation, the mass eccentricity can be further corrected with higher accuracy by using at the same time a method in which the central axis of the tag antenna coincides with the center of the RFID tag, as described in the first embodiment.

(Fourth Variation)

Figure 13:
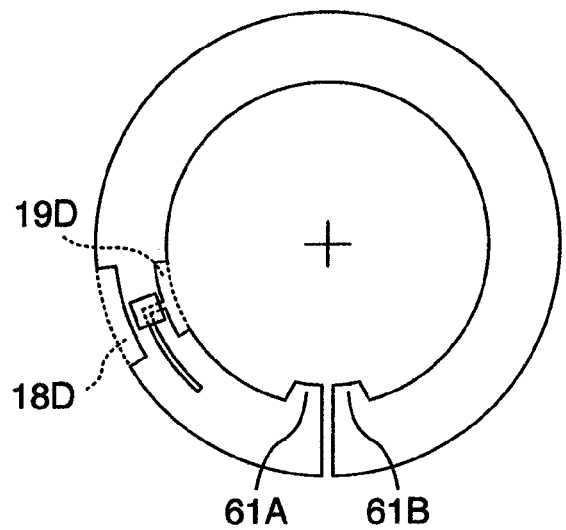
FIG. 13 is a top plan view of the tag antenna according to the second embodiment of the present invention (the fourth variation).

The third variation shows a mode in which when removing the antenna material at a position being point-symmetric with respect to the rotation center, the mass eccentricity due to the gap 35 is corrected. The fourth variation shows a case in which when adding to the antenna ends the antenna material corresponding to the weight of the gap 35, the mass eccentricity is corrected. With reference to FIG. 13, a correction method will be described. When in the circular antenna being discontinuous at the gap 35, the antenna material corresponding to the weight of the gap 35 is added to both of the antenna ends forming the gap 35, the mass eccentricity is corrected. Accordingly, the fourth variation has a shape in which the antenna ends 61A and 61B are wider in width than the other antenna portions. Further, when a distance from the rotation center, namely, the torque is considered, the addition method of the antenna material to the outer peripheral side has an advantage in that a portion corresponding to the antenna ends 61A and 61B is reduced.

(Fifth Variation)

Figure 14:
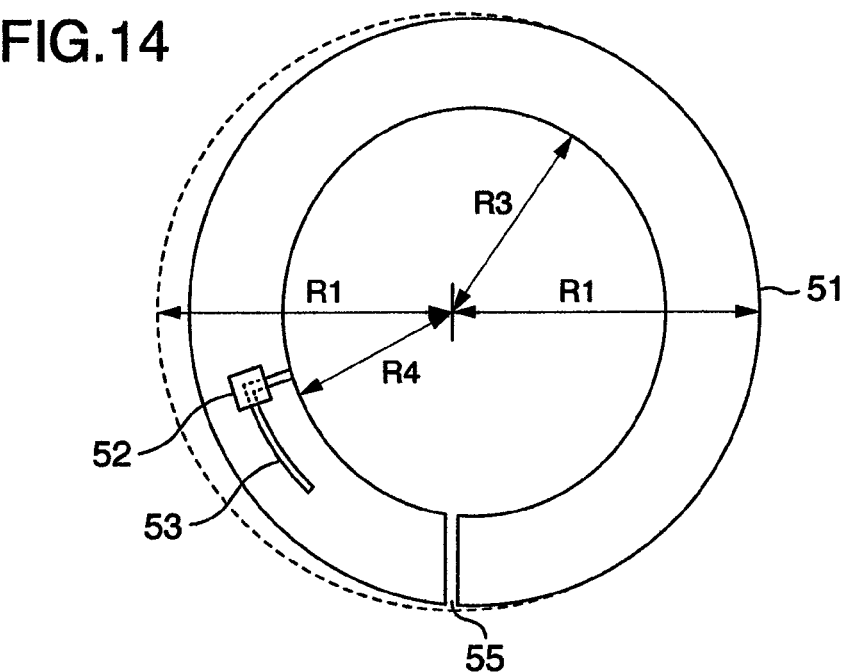
FIG. 14 is a top plan view of the tag antenna according to the second embodiment of the present invention (the fifth variation).

With reference to FIG. 14, description will be made on a correction method in which a distance from the rotation center is used. Using as an example an open ring-shaped circular antenna with an inner radius of R3, when a distance from the rotation center is set to R4 smaller than R3, the torque of the IC chip is reduced and therefore, the mass eccentricity due to the IC chip 52 and the slit 53 can be canceled and the amount of the mass eccentricity can be reduced. When a distance from the rotation center corresponding to an inner radius of R4 increases, the correction can be performed relative to the gap 55. When the correction is further performed with high accuracy, the method according to the first embodiment in which the tag antenna is rotated around the central axis may be performed.

Third Embodiment

Figure 15:
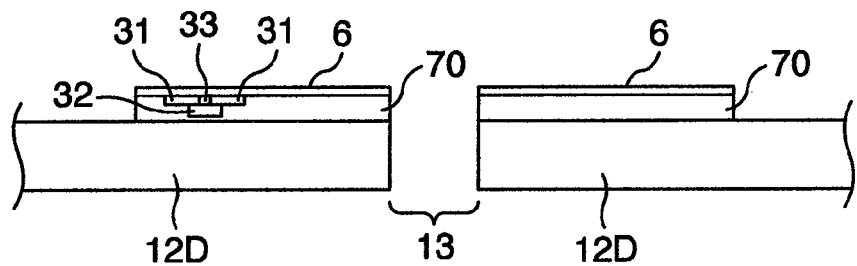
FIG. 15 is a cross section view showing the RFID tag according to the third embodiment of the present invention.

The reading speed of the disk medium is increased and the number of rotations of the disk medium is increased and therefore, a reading error may be caused by vibrations due to the turbulence of air flow generated within the disk drive. In the present embodiment, with reference to FIG. 15, description will be made on a structure of the RFID tag for preventing the turbulence of air flow generated within the disk drive. The RFID tag described in the first and the second embodiments has a structure in which the IC chip is formed on the disk medium. However, the RFID tag has a shape in which the IC chip has a thickness of 50 μm and only the IC chip having a protrusion with a height of 50 μm is formed on the antenna. A protective film is formed on the tag antenna; however, the periphery of the IC chip is projected. When the disk medium rotates at high velocity, the turbulence of air flow is generated within the disk drive due to this protrusion and vibrations of the disk medium occur. As a result, the reading error is caused. When the RFID tag has a structure in which the IC chip is prevented from being projected on the surface, that is, a structure in which a substrate 6 of the tag antenna faces outward as shown in FIG. 15, the protrusion of the IC chip can be eliminated on the surface of the RFID tag. More specifically, when attaching the RFID tag on the disk medium through an adhesive having the same thickness as that of the IC chip 32 on the antenna surface of the RFID tag or through a flattening material 70 such as a material which the adhesive is applied to each surface of a resin film, a surface of the RFID tag can be flattened. As the adhesive intervening between the disk medium and the RFID tag or the flattening material 70 serving as a film with an adhesive previously described, a material with a shape in which a hollow or hole for storing the IC chip is opened is used. A resin such as PET, PEN and PP, or paper is used as this film. Thereby, the turbulence of air flow generated within the disk drive can be reduced and the reading error at the high rotation velocity can be reduced. The method of correcting the mass eccentricity of the RFID tag used in the present embodiment is performed using the methods according to the first and the second embodiments previously described.

<Impedance Matching between Antenna and IC Chip>

Figure 16A:
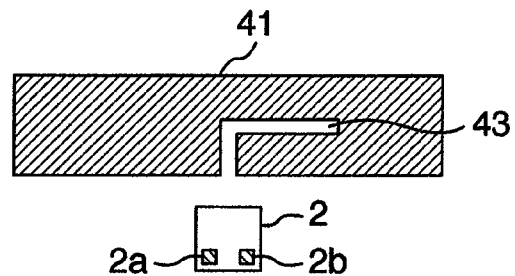
Figure 16B:
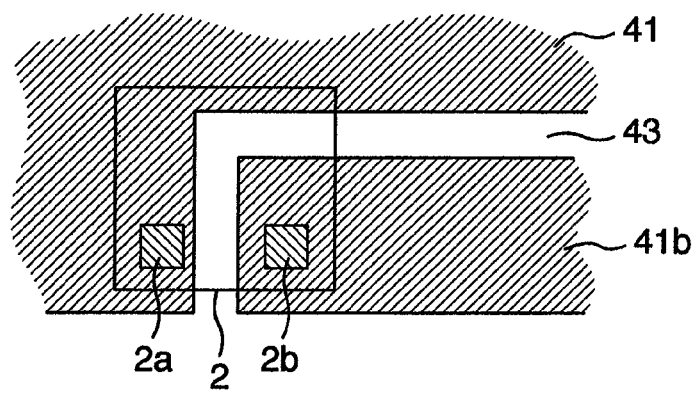
Figure 16C:
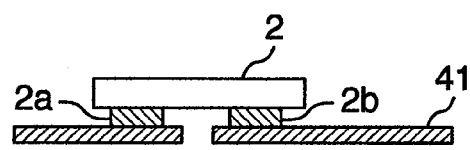

Description will be made in detail on a specific example in which a slit for impedance matching is provided in an antenna 41 to mount the IC chip 2 thereon. FIGS. 16A to 16D are process drawings showing a process for mounting the IC chip 2 on the feeding section of the antenna 41, in which FIG. 16A shows feeding sections of the antenna 41 and the IC chip 2, FIG. 16B shows a perspective enlarged view of the feeding section when mounting the IC chip 2 on the antenna 41, and FIG. 16C shows a cross sectional view of the junction between the antenna 41 and the IC chip 2.

As shown in FIG. 16A, a key-like (L-shaped) slit 43 for performing the impedance matching between the IC chip 2 and the antenna 41 is formed on the feeding section of the antenna 41 and a portion surrounded by the key-like slit 43 is formed as a stub 41b. Further, in the IC chip 2, signal input/output electrodes 2a and 2b are formed at a distance to straddle the slit 43.

That is, a width of the slit 43 is somewhat narrower than a distance between signal input/output electrodes 2a and 2b of the IC chip 2. Therefore, as shown in FIG. 16B, when the IC chip 2 is mounted on the antenna 41, the signal input/output electrodes 2a and 2b of the IC chip 2 are connected to the antenna 41 so as to straddle the slit 43. When a stub 41b formed by formation of the slit 43 is serially connected between the antenna 41 and the IC chip 2, the stub 41b between the antenna 41 and the IC chip 2 operates as a serially connected inductance component. Accordingly, the input/output impedance between the antenna 41 and the IC chip 2 is matched due to this inductance component. In other words, a matching circuit is formed by the slit 43 and the stub 41b. As shown in FIG. 16C, the signal input/output electrodes 2a and 2b of the IC chip 2 is electrically joined to the antenna 41 using gold bump by an ultrasonic joining method, a metal eutectic joining method, or a joining method via an anisotropic conductive film (not shown).

Figure 16D:
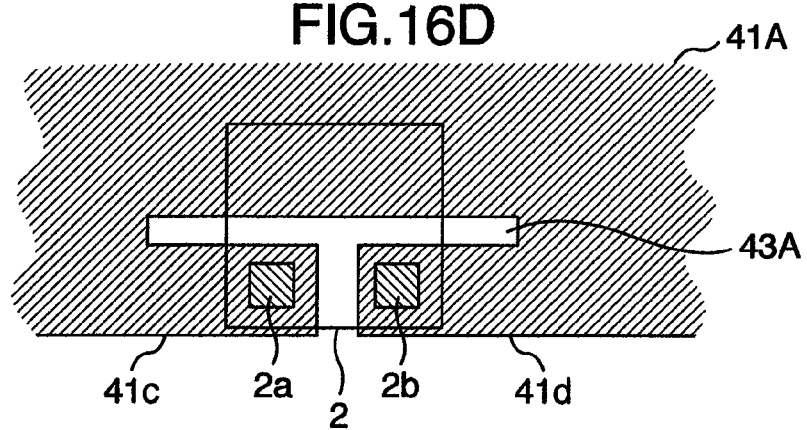

Further, the slit formed in the antenna 41A can also be formed into not an L shape but a T shape. FIG. 16D is a conceptual diagram for mounting the IC chip 2 on a feeder section of the T shaped slit 43A in the antenna 41A. As shown in FIG. 16D, also when forming the slit 43A in the antenna 41A into a T shape and serially connecting the stubs 41c and 41d between the IC chip 2 and the antenna 41A, the impedance between the antenna 41A and the IC chip 2 can be matched in the same manner as in the case of the L shaped slit 43.

Also when the RFID tag according to the present embodiment is attached on a CD or DVD, the amount of mass eccentricity can be reduced, and therefore, the RFID tag can be read by a high-speed rotation type reader. Further, the RFID tag can be attached on the disk medium without regard to a forming position of the metal conductive layer of the CD or DVD. Accordingly, in a field of managing a large amount of disk media, information of each disk medium can be effectively managed, and further, management enhancement of recording media on sensitive information and personal information can be realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An RFID tag, comprising:
    an antenna;
    an IC chip; and
    a substrate, wherein
    information recorded in the IC chip is wirelessly transmitted;
    the antenna is a dipole antenna in a shape of one of part of a curve and part of a polygon, each having a uniform width, and
    a position of a combined center of gravity of the antenna and the IC chip, and a position of a center of gravity of the substrate coincide with each other,
    wherein the antenna includes a first antenna portion and a second antenna portion whose lengths are different from each other, and the IC chip is mounted on a boundary of the first antenna portion and the second antenna portion,
    wherein when a wavelength of an operating frequency is set to $\lambda$, an electric length of the first antenna portion is equal to or less than $\lambda/4$, and
    wherein when a wavelength of an operating frequency is set to $\lambda$, an electric length of the second antenna portion is equal to $\lambda/2$.

2. A disk medium having an antenna for wirelessly transmitting information recorded in an IC chip, wherein
    the antenna is a dipole antenna in a shape of one of part of a curve and part of a polygon, each having a uniform width; and
    a combined center of gravity of the antenna and the IC chip, and a rotation axis of the disk medium coincide with each other,
    wherein the antenna includes a first antenna portion and a second antenna portion whose lengths are different from each other, and the IC chip is mounted on a boundary of the first antenna portion and the second antenna portion, and
    wherein when a wavelength of an operating frequency is set to $\lambda$, an electric length of the first antenna portion is equal to or less than $\lambda/4$, and an electric length of the second antenna portion is equal to $\lambda/2$.

* * * * *